United States Patent

Tesoro et al.

[15] 3,650,670

[45] Mar. 21, 1972

[54] N-(OXYMETHYL) DERIVATIVES OF PHOSPHONOPOLYAMINO-S-TRIAZINES USED AS FLAME RETARDANTS FOR CELLULOSIC MATERIALS

[72] Inventors: Guiliana Tesoro, Dobbs Ferry, N.Y.; Stephen B. Sello, Cedar Grove; Donald R. Moore, Rutherford; Rudolf F. Wurster, Weehawken, all of N.J.

[73] Assignee: J. P. Stevens & Co., Inc., New York, N.Y.

[22] Filed: Apr. 15, 1970

[21] Appl. No.: 33,147

Related U.S. Application Data

[62] Division of Ser. No. 716,323, Mar. 27, 1968, Pat. No. 3,551,422.

[52] U.S. Cl............................8/116.3, 8/129, 8/116.2, 8/116 P, 106/15 FP, 117/137, 252/8.1, 260/231 A
[51] Int. Cl............D06m 13/28, D06m 13/32, D06m 13/44
[58] Field of Search.................8/116.3, 116 P, 116.2; 117/137; 106/15 FP; 260/231 A

[56] References Cited

UNITED STATES PATENTS

| | | | |
|---|---|---|---|
| 3,011,998 | 12/1961 | D'Alelio | 8/116.3 X |
| 3,050,522 | 8/1962 | Coates et al. | 8/116.3 |
| 3,551,422 | 12/1970 | Tesoro et al. | 8/116.3 |

*Primary Examiner*—George F. Lesmes
*Assistant Examiner*—J. Cannon
*Attorney*—Bernard Marlowe and Kenyon & Kenyon Reilly Carr and Chapin

[57] ABSTRACT

There are disclosed N-(oxymethyl) derivatives of phosphonopolyamino-s-triazines, such as 2,4-bis-(hydroxymethyl)-6-(0,0'-diethylphosphonomethyl)-s-triazine and the corresponding 2,4-bis(methoxymethyl) derivative. These compounds are produced by reaction of the corresponding amine, e.g., 2,4-diamino-6-(0,0'-diethylphosphonomethyl)-s-triazine, with formaldehyde, either alone or in combination with an alkanol, such as methanol, in aqueous medium. The products are useful either alone or in combination with organo-nitrogen compounds as flame-retardant agents for cellulose. A durable treatment is obtained by insolubilization with acidic catalysts or hydrogen peroxide.

6 Claims, No Drawings

N-(OXYMETHYL) DERIVATIVES OF PHOSPHONOPOLYAMINO-S-TRIAZINES USED AS FLAME RETARDANTS FOR CELLULOSIC MATERIALS

This is a division of application Ser. No. 716,323, filed Mar. 27, 1968 and now U.S. Pat. No. 3,551,422.

DESCRIPTION OF THE INVENTION

This invention is concerned with compounds comprising at least one phosphono radical and an N-(oxymethyl)amino-s-triazine radical. More particularly, this invention relates to phosphono-substituted polyamino-s-triazines. In a further embodiment, this invention is concerned with the use of such compounds as flame-retardant agents for cellulose.

The compounds of the present invention are represented by the general formula:

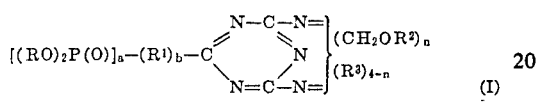

(I)

wherein R is lower alkyl, halogen-substituted lower alkyl or O,O'-di-lower alkylphosphono-substituted lower alkyl; $R^1$ is a divalent or trivalent saturated, acyclic organic radical consisting of from one to about 10 carbons and up to two heteroatoms of the group amine or hydrazine nitrogen, ether oxygen and thioether sulfur, said radical being bonded to phosphorus from carbon; each of $R^2$ and $R^3$ is hydrogen or lower alkyl; $a$ is an integer having a value of 1 or 2, and is 1 when R is phosphono-substituted alkyl; $b$ is an integer having a value of 0 or 1; and $n$ is an integer having a value of from 1 to 4.

By the term "lower alkyl" is meant a linear or branched chain alkyl group of up to about 10, preferably about 6, carbons, such as methyl, ethyl, n-propyl, isopropyl, tert-butyl and the like, with methyl and ethyl being preferred. By the term "lower alkylene" is meant a divalent linear or branched alkylene group of up to about 10, preferably about six, carbons, such as methylene, ethylidene, ethylene, propylidene, isopropylidene, trimethylene, tetramethylene, methyl-substituted trimethylene and methyl-substituted tetramethylene groups, and the like. By the term "lower alkanetriyl" is meant a trivalent linear or branched saturated acyclic hydrocarbon radical of up to about 10, preferably about six, carbons, such as methylidyne, ethylidyne, ethylidenyl, 1,2,3-propanetriyl and the like. By the term "oxymethyl" is meant an alkoxymethyl or hydroxymethyl group. By the term "halogen" is meant a halogen having an atomic number of 17 to 53, inclusive, (chlorine, bromine and iodine) with chlorine and bromine being preferred.

As is apparent from the foregoing, the N-(oxymethyl) derivatives comprise an s-triazine nucleus substituted on one nuclear carbon thereof with a phosphono-containing radical and on each of the remaining nuclear carbons with an amino or substituted amino group, there being at least one substituted amino group and at least one N-(oxymethyl)-substituent. The portion of these compounds exclusive of the phosphono-containing radical will be referred to hereinafter as an N-(oxymethyl)-substituted 2,4-diamino triazine residue. Illustrative of these residues are radicals such as 2-amino-4-(hydroxymethylamino)-s-triazin-6-yl, 2,4-bis-(hydroxymethylamino)-s-triazin-6-yl, 2-(hydroxymethylamino)-4-[bis(hydroxymethyl)amino]6-yl, 2,4-bis[bis(hydroxy-methyl)amino]-s-triazin-6-yl, 2,4-bis(methoxymethylamino)-s-triazin-6-yl, 2,4-bis(isopropoxymethylamino)-s-triazin-6-yl, 2,4-bis(tert-butoxymethylamino)-s-triazin-6-yl, 2-(N-hydroxymethyl-N-methylamino)-4-(dimethylamino)-s-triazin-6-yl, and the like.

The compounds of this invention also may be categorized according to the nature of the phosphono-containing radical. In the ensuing discussion the N-(oxymethyl)-substituted 2,4-diamino triazine residue will not be redefined, but will be referred to simply as the triazine residue. It will be understood, however, that the various phosphono-containing radicals to be disclosed either specifically or generally can be attached to any of the previously disclosed triazine residues.

A preferred class of compounds within the scope of Formula (I) is that represented by the formula:

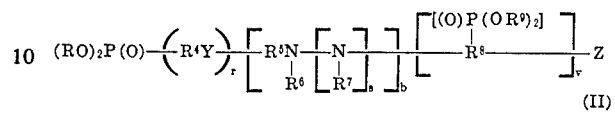

(II)

wherein R is as defined above; each of $R^4$ and $R^5$ is alkylene of not more than about 10 carbons; $R^6$ is hydrogen, lower alkyl, or O,O'-substituted-phosphonoalkyl of the formula $(R^9O)_2P(O)R^4-$; $R^7$ is hydrogen or lower alkyl; $R^8$ is alkylene or alkanetriyl of not more than about 10 carbons; $R^9$ is lower alkyl; Y is oxy, thio, imino or lower alkylimino; Z is the N-(oxymethyl)-substituted triazine residue of Formula (I); and each of $r$, $s$, $t$, $u$ and $v$ has a value of 0 or 1; with the provisos that the total carbons in $R^4$, $R^5$ and $R^8$ is not more than about 10; the sum of each of $r+s$, $r+u$ and $t+u$ is 1; $r$ is 0 when $R^6$ is phosphonoalkyl; and $u$ is 0 and $R^6$ is hydrogen or alkyl when R is phosphonoalkyl.

Preferred compounds are those wherein no hydrocarbon radical (alkyl, alkylene or alkanetriyl) has more than four carbons, with those containing from one to two carbons (methyl, methylene, methylidyne, ethyl, ethylene, ethylidene, ethylidenyl, ethylidyne) being particularly preferred. In addition Y is desirably imino or alkylimino, and $R^6$ is desirably hydrogen.

The compounds of Formula II may be further divided into several subclasses. The first subclass comprises the monophosphonates of the general formula:

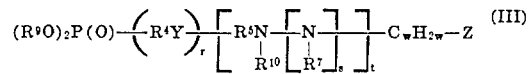

(III)

Wherein $R^4$, $R^5$, $R^7$, $R^9$, Y, Z, $r$, $s$ and $t$ are as defined above; $R^{10}$ is hydrogen or lower alkyl; and $w$ is an integer having a value of from 0 to about 10, preferably from 0 to 1.

Within this class, the alkyl groups defined by $R^7$, $R^9$ and $R^{10}$ are desirably methyl or ethyl; the alkylene groups defined by $R^4$ and $R^5$ are desirably ethylene; and $w$ is preferably 0 when $t$ is 1.

This subclass may be further subdivided into:

A. Dialkylphosphono- and (Dialkylphosphono)alkyl-substituted triazines of the formula:
$(R^9O)_2P(O)—C_wH_{2w}—Z$     (III-A)
wherein $R^9$, $w$ and Z are as defined above.

B. (Dialkylphosphono)alkylhetero- and [(Dialkylphosphono)alkylhetero]alkyl-substituted triazines of the formula:
$(R^9O)_2P(O)—R^4—Y—C_wH_{2w}—Z$     (III-B)
wherein $R^4$, $R^9$, Y, $w$ and Z are as defined above.

C. (Dialkylphosphono)alkylhydrazino- and [(Dialkylphosphono)alkylhydrazino]alkyl-substituted triazines of the formula:

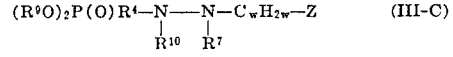     (III-C)

wherein $R^4$, $R^7$, $R^9$, $R^{10}$, $w$ and Z are as defined above.

D. [(Dialkylphosphono)alkylhetero]alkylamino- and {(Dialkylphosphono)alkylhetero]alkylamino}alkyl-substituted triazines of the formula:

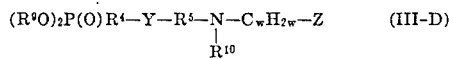     (III-D)

wherein $R^4$, $R^5$, $R^9$, $R^{10}$, w and Z are as defined above.

A second major subclass of phosphono-substituted triazines comprises the polyphosphonates, which can be further subdivided into three classes. The first of these classes comprises the O,O'-bis(O,O'-dialkylphosphonoalkyl)phosphono-substituted triazines of the formula:

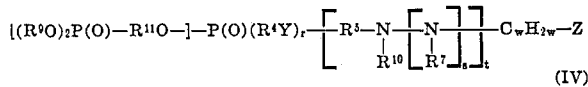
(IV)

wherein $R^4$, $R^5$, $R^7$, $R^9$, $R^{10}$, r, s, t, w, and Z are as defined above and $R^{11}$ is alkylene.

The alkyl groups defined by $R^7$, $R^9$ and $R^{10}$ are preferably methyl or ethyl; the alkylene groups defined by $R^4$, $R^5$ and $R^{11}$ are preferably ethylene, and w is preferably 0 when t is 1. This class, like the class of Formula (III), can be further subdivided in accordance with the complexity of the linkage between the phosphono and triazine radicals.

The second grouping of the polyphosphonates comprises the bis(dialkylphosphono)alkyl-s-triazines of the formula:

$$[(R^9O)_2P(O)]-_2R^{12}-Z \qquad (V)$$

wherein $R^9$ and Z are as defined above and $R^{12}$ is alkanetriyl, especially from one to two carbons.

The third grouping of polyphosphonates comprises the N,N-bis-[(dialkylphosphono)alkyl]amino- or N,N-bis-[(dialkylphosphono)alkyl]aminoalkyltriazines and the corresponding phosphonoalkyl-substituted hydrazines of the formula:

(VI)

wherein $R^7$, $R^9$, $R^{11}$, s, w and Z are as defined above. The alkyl groups defined by $R^7$ and $R^9$ are preferably methyl or ethyl; $R^{11}$ is preferably ethylene and w is preferably 0.

Illustrative examples of these compounds include N-(oxymethyl) derivatives of:

2,4-Diamino-6-(O,O'-dimethylphosphono)-s-triazine;
2,4-Diamino-6-(O,O'-diethylphosphono)-s-triazine;
2,4-Diamino-6-(O,O'-diisopropylphosphono)-s-triazine;
2,4-Diamino-6-(O,O'-dibutylphosphono)-s-triazine;
2,4-Diamino-6-(O,O'-diethylphosphonomethyl)-s-triazine;
2,4-Diamino-6-[2-(O,O'-dimethylphosphono)ethyl]-s-triazine;
2,4-Diamino-6-[N-(O,O'-diethylphosphonoethyl)-amino]-s-triazine;
2,4-Diamino-6-[2-(O,O'-diethylphosphono)ethoxy]-s-triazine;
2,4-Diamino-6-[2-(O,O'-diethylphosphono)ethyl-thio]-s-triazine;
2,4-Diamino-6-{N-[1-(O,O'-diethylphosphono)-butyl]amino}-s-triazine;
2,4-Diamino-6-[N-ethyl-N-(O,O'-diethylphosphonoethyl)amino]-s-triazine;
2,4-Diamino-6-{N-[2-(O,O'-diethylphosphono)-ethyl]aminomethyl}-s-triazine;
2,4-Diamino-6-{N-[2-(O,O'-diethylphosphono)-ethyl]hydrazino}-s-triazine;
2,4-Diamino-6-{2-[2-(O,O'-diethylphosphono)-ethylamino]ethylamino}-s-triazine;
2,4-Diamino-6-{2-[2-(O,O'-diethylphosphono)-ethyloxy]ethylamino}-s-triazine;
2,4-Diamino-6-[O,O'-bis(diethylphosphonomethyl)-phosphono]-s-triazine;
2,4-Diamino-6-[O,O'-bis(diethylphosphonoethyl)-phosphono]-s-triazine;
2,4-Diamino-6-[O,O'-bis(diisopropylphosphono-ethyl)phosphonomethyl]-s-triazine;
2,4-Diamino-6-{N-[O,O'-bis(diethylphosphono-ethyl)phosphonoethyl]aminoethyl}-s-triazine;
2,4-Diamino-6-[bis(O,O'-dimethylphosphono)-methyl]-s-triazine;
2,4-Diamino-6-[1,2-bis(O,O'-diethylphosphono)-ethyl]-s-triazine;
2,4-Diamino-6-[2,2-bis(diethylphosphono)ethyl]-s-triazine;
2,4-Diamino-6-[N,N-bis(O,O'-diethylphosphonoethyl)amino]-s-triazine;
2,4-Diamino-6-[N,N-bis(O,O'-dibutylphosphonoethyl)amino-methyl]-s-triazine;
2,4-Diamino-6-{N,N-bis[2-(O,O'-diethylphosphono)-ethyl]hydrazino}-s-triazine.

The (oxymethyl) derivatives of phosphono-substituted polyamino triazines of this invention are readily prepared by a variety of methods from known starting materials by first synthesizing the corresponding phosphono-substituted polyamino triazine followed by conversion of the amine to the N-(oxymethyl) derivative.

The aminophosphonotriazines are produced by a variety of known techniques. The first and most general technique employs the Arbuzov Reaction wherein a phosphite is reacted with a halogen-substituted compound to form a phosphonate as illustrated by the following:

Reaction A:

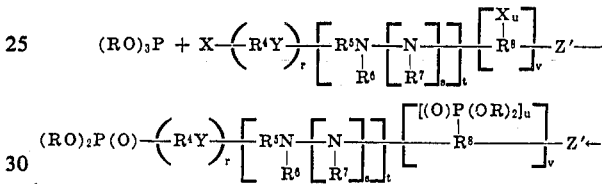

wherein all variables but X and Z' are as previously defined, X is halogen and Z' is a 2,4-diamino-s-triazin-6-yl radical having only N-alkyl groups as substituents.

Suitable phosphites include trimethyl phosphite, triethyl phosphite, triisopropyl phosphite, tri-tert-butyl phosphite, trihexyl phosphite, tris(2-chloroethyl) phosphite, tris(2-bromoethyl) phosphite and the like.

Suitable halogenated starting materials include 2,4-diamino-6-chloro-s-triazine, 2,4-diamino-6-bromo-s-triazine, 2,4-diamino-6-chloromethyl-s-triazine, 2,4-diamino-6-(2,2-dibromoethyl)-s-triazine, 2,4-diamino-6-(1,2-dibromoethyl)-s-triazine, 2,4di-amino-6-(2-chloroethylamino)-s-triazine, and the like.

This reaction is readily effected by admixing the phosphite, preferably in stoichiometric excess, with the halogen-containing triazine and heating the resulting mixture at elevated temperature, suitably the reflux temperatures. After completion of the reaction excess phosphite can be distilled off.

In a second procedure, phosphonoalkylamino derivatives are obtained by reaction of an amine and a halogen-containing compound:

Reaction B:

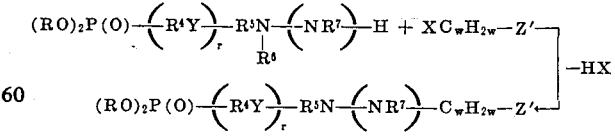

wherein all variables are as previously defined.

Suitable triazines include those discussed with reference to Reaction A, above. Aminoalkylphosphonates which can be employed include diethyl aminomethylphosphonate, diethyl 1-aminoethylphosphonate, diethyl 1-aminopentylphosphonate, diethyl 2-(2-aminoethylamino)ethylphosphonate, diethyl 2-(2-aminoethyoxy)-ethylphosphonate, diethyl 2-(2-aminoethylthio)ethylphosphonate and the like.

In a specific embodiment of this technique wherein the phosphonate ester is a 1-(dialkylphosphono)alkylamine, the ester may be synthesized in situ by charging an aldehyde, a dialkyl phosphite and ammonia, which yield the amine:

Reaction C:

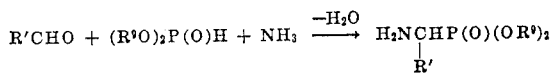

wherein $R^9$ is as previously defined and $R'$ is hydrogen or lower alkyl.

Related to this last reaction is one in which melamine is reacted with an aldehyde and a phosphite to yield an N-(phosphonoalkyl) derivative:

Reaction D:

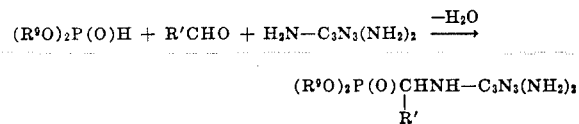

wherein $R'$ and $R^9$ are as defined above.

Still another procedure comprises the reaction of an alkyl (O,O'-dialkylphosphono)alkanoate with biguanide:

Reaction E:

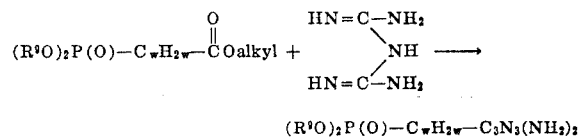

wherein $R^9$ and w are as defined above.

This reaction is particularly successful with lower alkyl, preferably ethyl, O,O'-dialkylphosphonoacetates, and is readily effected by slow addition of the ester to excess biguanide at room temperature to about 40° C. in a lower alkanol as a solvent, followed by heating at 50° to 90° C. for about one hour. The desired product is obtained by filtration of the reaction mixture.

Still other methods are available for the preparation of suitable aminotriazine precursors. For example, sodium bis-(dialkylphosphono)methanes can be reacted with halo- or haloalkyl-diamino-s-triazines:

Reaction F:

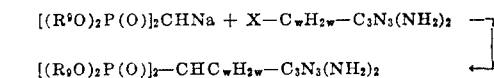

In addition, 3-(dialkylphosphono)propionitrile is reacted with a cyanoguanidine to produce 2,4-diamino-6-[2-(O,O'-dialkylphos-phono)ethyl]-s-triazines.

Reaction G:

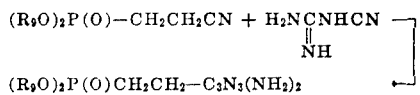

Still another technique comprises the well known reaction wherein a compound containing an activated vinyl group is reacted with a compound containing active hydrogen. Thus, a vinylphosphonate may be reacted with a substituted triazine:

Reaction H:

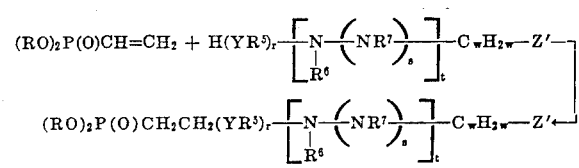

wherein all variables are as defined above, with the proviso that at least one of $r$ and $t$ is 1.

The reactants employed in the various reactions outlined above are generally known compounds. The reactants containing one or more hetero atoms in the chain, although not always known compounds, are readily synthesized from known compounds by a known procedure. For example, the triazine derivatives employed in Reaction H wherein there are two hetero atoms in the chain are obtained by reaction of hydrazine, a diamine, or a hydroxy amine with a halogen-substituted triazine:

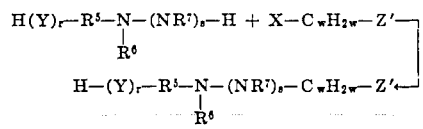

Phosphonates useful in the reaction of Reaction B are obtained, for example, by reaction of ethylenimine with a 2-substituted ethylphosphonate in accordance with the equation:

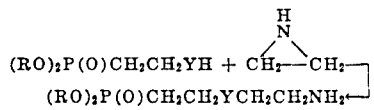

The amine precursors of the bis(dialkylphosphonoalkyl)-phosphono-substituted compounds of Formula (IV) may be prepared by any of the foregoing reaction sequences if desired. It is preferred, however, to employ one of the foregoing techniques to produce a bis(haloalkyl)phosphono-substituted polyamino-s-triazine of the formula:

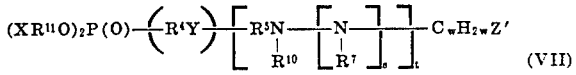

wherein all variables are defined above.

These compounds are then reacted with a trialkyl phosphite (Arbuzov reaction) to produce the bis(dialkylphosphonoalkyl)phosphono-substituted derivative.

The N-(oxymethyl) derivatives of this invention are synthesized from the corresponding amines by reaction of the amine with formaldehyde. In general, an aqueous dispersion (e.g., a slurry) is made of the ester of the 2,4-diamino-6-phosphono-s-triazine, using preferably 0.1 to 1 kilogram of water per mole of diamino compound. If an (alkoxymethyl) derivative is desired rather than a (hydroxymethyl) derivative, the appropriate alkanol is added at this point. While the dispersion is kept preferably at 10° to 70° C., formaldehyde is added. The amounts of formaldehyde and alkanol are selected on the basis of the degree of N-substitution desired, i.e., from one to four N-(oxymethyl) groups can be introduced on the diamino compound by employing the appropriate corresponding ratio of formaldehyde (and alkanol) to diamino compound. It is convenient to add the formaldehyde in the form of a strong aqueous solution, such as the 30 to 40 percent solution available commercially. A small amount of a base may be used as a catalyst to increase the reaction rate (as 4 to 40 ml. of 1-normal sodium carbonate per mole of diamino compound). A reaction period of 0.5 to 3 hours is usually adequate for a catalyzed reaction, whereas 5 to 30 hours is usually needed without a catalyst. The N-(oxymethyl) derivative may be isolated by evaporating the reaction solution. Ordinarily the product will be a mixture of derivatives having varying degrees of N-(oxymethylation). A single product can be obtained, however, by employing a sufficient excess of formaldehyde (and alkanol) to ensure oxymethylation at all available amino hydrogens.

The compounds of this invention, because of the presence of various functional groups, have utility as reaction intermediates for a variety of products. They are of particular utility, however, as flame-retardant agents for cellulose.

It has long been known that flame-retardant properties may be imparted to cellulose, particularly in a textile form, by treatment with phosphoric acid or compounds capable of forming phosphoric acid or its anhydride on burning. However, these methods are generally unacceptable due to serious degradation of the cellulose as well as lack of durability of the treatment.

More recently treatments employing organophosphorus compounds have been developed in an effort to provide flame retardance without concurrent damage to the cellulose and to render the phosphorus-containing agent resistant to removal during laundering. Although many of these treatments are in commercial use today, none has been completely successful due to the high cost of the organophosphorus compound and the high degree of add-on of organophosphorus compound required to provide flame-retardant properties.

Still more recently G. C. Tesoro has discovered that organic nitrogen is a synergist for phosphorus-induced flame retardance in cellulose, and thus allows the use of reduced amounts of organophosphorus compound. For example, when 6- to 10-ounce cotton fabric is treated with an organophosphorus compound little or no flame-retardant effect is observed until at least about 1.5 weight percent phosphorus, based on cellulose, is present, and acceptable flame-retardant properties are not achieved until the phosphorus content is at least about 2 percent. By incorporating sufficient organic nitrogen into the treatment, however, excellent flame-retardant properties can be obtained at phosphorus contents as low as about 0.2 weight per cent, despite the fact that organic nitrogen compounds alone are not flame retardant agents. In such treatments the amount of nitrogen which is required increases as the phosphorus content decreases.

Previously the nitrogen-phosphorus ratio necessary to achieve a desirable degree of flame retardance at low phosphorus contents could be obtained only through the use of a mixture of reagents, and in many cases the treatment was not durable, i.e., resistant to laundering. In addition many of the reagents, especially the phosphorus-containing compounds, were soluble only in organic media, thus presenting potential health hazards as well as increasing the expense of the process. Finally, the previously evaluated reagents frequently had low phosphorus and nitrogen contents, thus requiring a high degree of add-on, with attendant adverse effect on physical properties such as hand, to achieve flame-retardant properties.

The N-(oxymethyl) phosphono-substituted polyamino-s-triazines of this invention are well suited for use as flame-retardant agents for cellulose. They contain a large proportion of nitrogen and phosphorus (frequently 30 weight percent or more) and a high atomic ratio of nitrogen to phosphorus (up to 5:1 or even higher). As a result, they can be employed alone (without other additives) at a low total add-on to achieve excellent flame-retardant properties. Moreover, they are soluble in water and thus do not require the use of organic media. They are readily insolubilized to provide an extremely durable treatment. Finally, the insolubilized compounds and flame-retardant treatments resist laundering even in the presence of hypochlorite bleach.

The flame-retardant treatment of this invention is effected by treatment of a cellulosic substrate with an aqueous solution of the N-(oxymethyl) phosphono polyamino triazine, which can be the aqueous solution in which it is prepared, by insolubilization of the agent on the substrate.

The concentration of the phosphono triazine in the aqueous solution is not critical, and will depend upon the amount required to achieve the desired degree of flame retardance and the manner in which the agent is to be applied to the substrate. For textile fabrics, a convenient method comprises padding the fabric to about 100 percent wet pickup. In such cases concentrations of from about 10 to about 25 weight per cent of the N-(oxymethyl) phosphono-substituted polyamino-s-triazine in the aqueous solution have been found suitable.

In addition to the agent of this invention, the aqueous solution will also contain a catalyst which promotes insolubilization of the triazine agent. Suitable insolubilization agents are those which can insolubilize $N^2,N^4,N^6$-tris(hydroxymethyl)-melamine, such as hydrogen peroxide or acidic catalysts.

When hydrogen peroxide is employed, it is present in the aqueous solution in an amount of from about 0.05 to about 0.5 weight percent, and after padding, the wet fabric is partially dried and then steamed, usually for from about 5 to about 10 minutes, and then rinsed and dried.

Acidic catalysts which are suitable for use with the present invention include the ammonium salts of mineral acids such as hydrochloric, sulfuric, phosphoric and nitric; amine salts of mineral acids; the chlorides and nitrates of zinc and magnesium; acid fluoride salts; zinc fluoroborate and others of this type. In addition to the above salts, nonvolatile acids of moderate strength such as citric acid and sodium hydrogen sulfate may also be employed.

Some of the above acidic catalysts, such as magnesium chloride, are latent acid catalysts, and provide acidic conditions upon heating. When such catalysts are used, the treated material must be heated to the temperature level necessary for production of the requisite acid conditions. Such latent acid catalysts are ordinarily employed in a concentration of from 0.5 to about 5 weight percent.

If the acidic catalyst is of the type that does not require heating to form hydrogen ions, for example, those catalysts which form hydrogen ions upon hydrolysis or ionization in water, the catalytic activity is generally controlled by appropriate choice of the pH of the treating solution. In such instance, the pH of the treating solution should be higher than about 3.5 since the use of acid catalysts yielding a substantially lower pH may adversely affect the cellulosic material being treated.

After padding with an acidic catalyst, the wet fabric is ordinarily dried at a moderately elevated temperature, for example 50° to 75° C., and then cured by heating at more elevated temperatures, such as from about 120° C. to about 180° C. The curing time at these temperatures will range from about 1 to about 20 minutes, and is inversely related to temperature.

The chemical structure of the resulting product is not entirely known. In the case of the acid-catalyzed reaction, at least a portion of the triazine compound is insolubilized by reaction of the N-(oxymethyl) groups with cellulosic hydroxyls as illustrated by the equation:

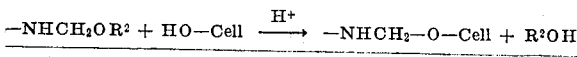

In addition, reaction may occur between the N-hydroxymethyl groups of two different compounds:

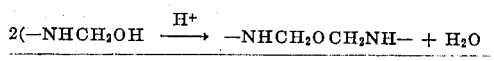

When n in Formula I is at least 2, polymers will be formed. In the case of the peroxide-catalyzed insolubilization the reactions which occur are even less clear, but probably include those discussed above, as well as other reactions. Regardless of mechanism, however, the N-oxymethylamino-phosphono-substituted triazines do become insolubilized, as is evidenced by the extreme durability of the treatment.

In addition to flame-retardant agent and insolubilization agent, the solution may contain other agents which can be employed to improve or modify cellulosic substrates. For example, when cellulosic textile materials are treated in accordance with this invention, the bath may contain such additives as softeners, optical brighteners, and the like.

Although the phosphono-s-triazines are excellent flame-retardant agents when employed above, they may be employed in combination with other flame retarding agents. In addition their efficacy as flame retarding agents may be improved by employing them in combination with organo-nitrogen compounds. In particular, the use of additional organo-nitrogen compounds permits the use of smaller amounts of the phosphonotriazines.

Suitable compounds for this purpose include organic compounds having a carbon-nitrogen linkage, with compounds wherein nitrogen is in the form of an amine or an amide group being preferred. Amide forms include the carboxamide

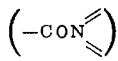

and sulfonamide

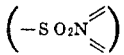

forms, with the carboxamide form being preferred. Particularly preferred nitrogen-containing compounds are those containing the linkage represented by the partial formula:

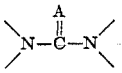

Wherein A is oxo, thioxo, or substituted or unsubstituted imino; i.e., compounds containing the ureylene, thioreylene or guanidinylene linkages.

The free valences of the above linkage may be bonded to hydrogen, carbon or nitrogen. Preferred acyclic compounds containing this linkage may be represented by the general formula:

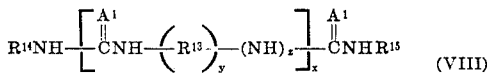 (VIII)

Wherein each $A^1$, when taken separately, is oxo, thioxo or imino; $R^{13}$ is a divalent hydrocarbylene, especially alkylene, radical of one to five carbons; $R^{14}$ and $R^{15}$ each are hydrogen, amino, cyano or hydrocarbyl or hydroxyhydrocarbyl, especially alkyl or hydroxyalkyl, of up to about 5 carbons; each of $y$ and $z$ has a value of 0 or 1; and $x$ is an integer having a value of at least 0 and preferably of 0 or 1.

Illustrative compounds include urea, thiourea, guanidine, dicyandiamide, biguanide, semicarbazide, carbohydrazide, biurea, 1,1'-ethylenediurea, 1,3-bis(hydroxymethyl)urea and the like.

Another class of nitrogen compounds are those heterocyclic compounds of the formula:

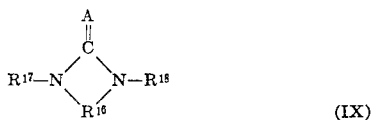 (IX)

Wherein A is as defined above; $R^{16}$ is a divalent hydrocarbyl group, preferably alkylene, of up to 6 carbons, which, when taken with the = NC(A)N = grouping, forms a five- to six-membered heterocyclic ring; and each $R^{17}$ and $R^{18}$ is hydrogen, lower hydrocarbyl, or lower hydroxyhydrocarbyl (e.g., lower alkyl or hydroxy lower alkyl of up to six carbons).

Illustrative examples include 2-imidazolidinone, 2-imidazolidinethione, 2-iminoimidazolidine, 1,3-diethyl-2-imidazolidi-none, 1,3-bis(hydroxymethyl)-2-imidazolidinone and the like.

Still another and an especially preferred class of useful nitrogen-containing heterocyclic compounds are the s-triazine derivatives of the formula:

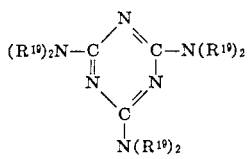 (X)

Wherein each $R^{19}$, independently, is hydrogen, lower hydrocarbyl or hydroxy or alkoxy lower hydrocarbyl, (e.g., lower alkyl or lower alkoxy lower alkyl).

Illustrative compounds include melamine, $N^2,N^4,N^6$-trimethylmelamine, $N^2,N^4,N^6$-tris(hydroxymethyl)melamine, hexakis(methoxymethyl)melamine and the like, with those wherein at least one $R^{19}$ of each amino group is hydroxymethyl or lower alkoxymethyl being particularly preferred.

In addition to these compounds, polyalkyleneamines, preferably containing at least four nitrogen atoms per molecule, wherein the alkylene group has from two to about six carbons, are highly desirable nitrogen compounds.

In this embodiment, the cellulose can be treated with the organo-nitrogen compound simultaneously with or before or after treatment with the s-triazine compound. The technique employed in treating the cellulose with the organo-nitrogen compound is not a part of this invention, and in general will be known to those of ordinary skill in the art. It is preferred, however, that the organo-nitrogen compound, at least in the form in which present in the final product, be relatively nonvolatile, such as a compound having a normal boiling point above about 200° C. and be resistant to removal by laundering. Particularly preferred organo-nitrogen compounds are those which are water-soluble for ease of application but which can be rendered insoluble, as by polymerization or reaction with the cellulose.

The amounts of phosphorus and nitrogen which are present on the cellulosic substrate are not critical to this invention, provided that they are at least sufficient to impart flame retardance. The specific amounts necessary for this purpose will depend upon the substrate and the standard of flame retardance employed.

For example, the substrate greatly influences the degree of flame retardance both on a molecular level and a macroscopic level. Thus, certain molecular forms of cellulose, for example, rayon, are more flammable than other forms, such as cotton. Similarly, certain physical forms, for example fibers or yarns, are more flammable than others, such as fabrics woven from the same fibers or yarns. Again, the density or surface area per unit weight affects flammability, lightweight fabrics (e.g., 4 ounces per square yard) being more flammable than heavier (e.g., 8-ounce) fabrics. In addition, thick substrates will require less agent on a weight per weight basis than a thin substrate.

Similarly, the required amounts of phosphorus and nitrogen will depend upon the particular standard of flame retardance employed. In this regard, it should be noted that no universal test has been devised to determine flame retardance. Indeed, there is no generally-accepted definition of the term. In most cases the article to be evaluated is tested under actual or simulated conditions of intended use, and the standard of flame retardance is related only to that use. As a result, the correlation of the degree of flame retardance obtained by a given flame-retardant agent on one cellulosic form with that obtained on a different cellulosic form based upon the teachings of the prior art is difficult, if not impossible.

As employed in this application, however, the term "flame retarding" is synonymous with "self-extinguishing." That is, flame-retardant properties obtain when, although the surface or article may burn when in direct contact with a flame source, the flame will go out once the source is removed rather than continue to propagate. One commonly employed test for determining flame retardance, as employed in this sense, is the so-called vertical flame test, which is generally applicable only to planar cellulose forms, for example cellulosic fabrics, whether bonded, knitted or woven, paper sheets and the like. In this test, a fixed flame source is applied to the bottom edge of a vertically held strip of the material for a given period of time and then removed. The length of the charred or burned portion, i.e., the "char length," of the sample is measured, and is the index of flame-retardant properties. On the other hand, the flame-retardant properties of wood treated to reduce flammability are frequently measured by the "crib" test (ASTM E 160-50), herein 24 specimen pieces (½ inch ×

½ inch × 3 inches) are subjected to a flame at 315° ± 8° C. for minutes, and the per cent weight loss and duration of glow are recorded. Still other tests have been devised for other forms of cellulose.

In the above-mentioned vertical flame test, it has been generally observed that the char length will be either less than about half of the sample, or the entire sample will be consumed. As a result, when employing a 10- or 12-inch by 2½-inch sample, flame-retardant properties are generally considered adequate if the char length is less than an arbitrarily selected value, generally 4½ to 6½ inches, depending upon fabric weight. As applied to an 8-ounce, woven cotton twill fabric, a char length of less than 5 inches is taken to signify an acceptable degree of flame retardance. To achieve this degree of flame retardance with 8-ounce cotton fabrics, the product produced in accordance with this invention should contain nitrogen in an amount equal to at least the value of the expression 6-2P where P is the weight percent phosphorus, based upon cellulose, in the range of from about 0.2 to about 3 percent. It should be noted that this expression is valid only for the specific substrate, although similar inverse relations will be observed with other substrates.

The treatment of this invention is applicable to cellulose in both textile and non-textile forms. Textile forms include filaments, fibers, yarns and fabrics (whether woven or nonwoven, such as bonded and knitwear fabrics.) The cellulose can be from any source, including such natural sources as seed hairs such as cotton, bast fibers such as flax (linen), ramie, jute or hemp, as well as synthetic sources, for example regenerated cellulose such as rayon, or modified rayon, and partially acylated cellulose such as partially acetylated cellulose. Non-textile forms include both fiber and non-fiber forms, such as wood, paper and cellulosic film, whether in native, regenerated or partially substituted form. The treatment of this invention, although of most benefit for wholly cellulosic materials, is generally useful for cellulosic materials containing at least about 30 weight percent cellulose, such as blended yarns and fabrics.

The following examples are illustrative. In the examples the following test methods were employed:

1. Laundering: Home-type washer, 5-pound load, full cycle, 60° C., with synthetic detergent.
2. Laundering with Hypochlorite Bleach: 0.5 pint of commercial bleach (5.25 percent solution of sodium hypochlorite) was added per 16 gallons, thereby diluting the NaOCl to 0.02 percent during laundering.
3. Shrinkage in Laundering (in %): The fabric was conditioned for at least 4 hours (relative humidity 65 ± 2 percent at 21 ± 1° C.), and markings were applied 8 inches apart in both warp (W) and filling (F) directions. Then the fabric was laundered and tumble dried, after which the fabric was re-conditioned for at least 4 hours and the distances between markings were remeasured.
4. Flex Abrasion Resistance (in cycles, in the warp direction): ASTM D 1175 61T; 0.5-pound head weight and 2-pound toggle tension on Stoll Flex Abrader.
5. Tensile Breaking Strength (in pounds, in the warp direction): One-inch ravelled strip method; ASTM D 1682 59T.
6. Damage Caused by Retained Chlorine: Percentage of tensile strength lost between scorched and unscorched strips; AATCC 92–1962.
7. Vertical Flame Test (Char Length in Inches): AATCC 34–1952. Modified textile fabrics having char lengths of 5 inches or less have acceptable fire resistance. "BEL" means "burned the entire length."
8. Whiteness Rating: AATCC 110–1964–9.
9. Nitrogen: Determined by Kjeldahl digestion followed by either (1) Nessler colorimetry, or (2) distillation as ammonia followed by titration.
10. Phosphorus: Determined by combustion using the Schoniger technique followed by colorimetry employing a molybdenum blue complex; or by Kjeldahl digestion followed by colorimetry employing acetone-water to intensify the phosphomolybdate color.

EXAMPLE I

A mixture of 10 grams of 2,4-diamino-6-(chloromethyl)-s-triazine and 20 milliliters of triethyl phosphite was heated at reflux temperature for 11 hours in a flask equipped with a reflux condenser. Unreacted triethyl phosphite was then distilled off in vacuo and the concentrated product was recrystallized from methanol to yield 3.2 grams of 2,4-diamino-6-(O,O'-diethylphos-phonomethyl)-s-triazine, m.p. 223° C.

Analysis: Calculated for $C_8H_{16}N_5O_3P$: C, 36.8%; H, 6.1%; N, 26.8%; P, 11.9%. Found: C, 36.9%; H, 6.2%; N, 26.9%; P, 11.7%.

The assigned structure was confirmed by infrared analysis. In a thin-layer chromatograph using silica gel "G" (with a binder), the $R_F$ value was 0.26 ± 0.04 for the ratio of the distance travelled by the solute to the distance travelled by the solvent, the solvent being 1-butanol: methanol 4:1 by volume.

A slurry was made from 120 grams (0.46 mole) of 2,4-diamino-6-(O,O'-diethylphosphonomethyl)-s-triazine and 160 milliliters of distilled water. While the slurry was kept at 20° C., a total of 82 grams of an aqueous 37 percent solution of formaldehyde (1.0 mole) was added during a 30-minute period. The mixture was heated to 62° C., and a solution resulted. The solution was stirred for 35 minutes longer and allowed to cool. Analysis of the reaction mixture for unreacted formaldehyde by means of hydroxylamine hydrochloride indicated that a conversion of 85 percent had occurred. That is, on the average, 1.7 moles of formaldehyde had reacted per mole of 2,4-diamino-6-(O,O'-diethylphosphonomethyl)-s-triazine. The solution weighed 370 grams, and theoretically 40.5 percent of it was the desired adduct. Evaporation to constant weight in high vacuum showed a solid content of 40 percent.

Analysis: Calculated for $C_8H_{16}N_5O_3(CH_2O)_{1.7}$: P, 9.65%; N, 21.8%; Bound $CH_2O$, 18.0%. Found: P, 9.45%; N, 22.1%; Bound $CH_2O$, 18.6.

The infrared spectrum in conjunction with the analytical values tabulated above confirmed that the product was a mixture of N-(hydroxymethyl) derivatives of 2,4-diamino-6-(O,O'-diethylphosphonomethyl)-s-triazine, such as the bis(hydroxymethyl) and mono(hydroxymethyl) derivatives.

A 100 percent cotton fabric (carded yarn sheeting weighing 4.0 ounces per square yard having a thread count (warp + filling) totaling 128) completely devoid of flame-retardant properties was padded to 112 percent wet pickup with a solution containing 20 weight per cent of the thus-produced N-(hydroxymethyl) product, 3 weight percent of an aqueous 30 percent solution of an amine hydrochloride designated as "Catalyst XRF" by Onyx Chemical Co., Jersey City, N.J., and 77 weight percent water. The resulting fabric was dried at approximately 65° C., cured for 5 minutes at approximately 163° C., rinsed in warm water and re-dried. The resulting sample (A) had a 17.4 percent weight gain, contained 1.62 percent phosphorus and 3.29 percent nitrogen by analysis, and had a char length in the vertical flame test was 5.6 inches.

A second portion (Sample B) of the sheeting was padded to 110 percent wet pickup with a solution containing 14 weight per cent of the N-(hydroxymethyl) product, 3 weight percent of "Catalyst XRF," 7 weight per cent of $N^2,N^4,N^6$-tris(hydroxymethyl)melamine (TMM), and 76 weight percent water, and then processed as described for Sample A.

A third sample (Sample C) of cotton sheeting was padded to 113% wet pick-up with a composition containing 17.9 weight percent of the N-hydroxymethyl phosphonate ester; 3.0 weight percent of "Catalyst XRF," 9.9 weight percent TMM and 69.2 weight percent water.

A fourth portion of the cotton sheeting (Sample D) was pretreated by wet fixation of $N^2,N^4,N^6$-tris(hydroxymethyl)-melamine (TMM) by padding to 106 percent wet pickup with a solution containing 18 weight percent TMM, 1 weight percent hydrogen peroxide (aq. 30 percent soln.) and 81 weight percent water. The padded fabric was partially dried to a moisture content of 20 percent, held for 24 hours at room temperature, rinsed in an aqueous 0.1 percent solution of p-(1,1,3,3-tetramethylbutyl)phenoxynona(ethylenoxy)ethanol, a nonionic detergent, and dried. The nitrogen content of this pretreated fabric was 4.5 percent. Part of the pre-treated fabric was padded to 100 percent wet pickup with a solution containing 16 weight percent of the N-hydroxymethyl phosphonate triazine product, 3 weight percent of "Catalyst XRF" (aq. 30% soln.), and 81 weight percent water. Processing was similar to that employed for Sample A.

The procedure described for the preparation of Sample D was repeated on a fifth portion of the cotton sheeting (Sample E), with the variation that the second pad bath contained 20 percent rather than 16 percent of the N-hydroxymethyl phosphonate triazine product. Data concerning all five samples with respect to their evaluation are summarized in the accompanying tables.

TABLE I

Analytical Data

| Sample | Weight Gain, % | Fabric Content, % P | N |
|---|---|---|---|
| A | 17.4 | 1.62 | 3.29 |
| B | 20.3 | 1.34 | 5.20 |
| C | 29.9 | 1.56 | 7.85 |
| D | 14.4 | 1.34 | 7.06 |
| E | 15.7 | 1.41 | 7.14 |

TABLE II.—FLAME RETARDANCE
[Char length, inches]

| Sample | No laundering | 10 launderings | | 25 launderings | | 50 launderings | |
|---|---|---|---|---|---|---|---|
| | | With bleach | Without bleach | With bleach | Without bleach | With bleach | Without bleach |
| A | 5.6 | 6.2 | 6.2 | 6.9 | 6.2 | 9.3 | 6.2 |
| B | 5.1 | 5.3 | 6.8 | 5.3 | 6.8 | 8.7 | 5.8 |
| C | 4.5 | 4.2 | 4.5 | 4.2 | 4.8 | 5.8 | 4.8 |
| D | 4.3 | 4.3 | 4.3 | 5.3 | 4.3 | 5.8 | 4.3 |
| E | 4.1 | 4.4 | 4.2 | 4.4 | 4.7 | 5.6 | 5.0 |

TABLE III.—PHYSICAL PROPERTIES

| Sample: | Tensile strength | Flex abrasion | Chlorine damage | Whiteness rating | Shrinkage W | Shrinkage F |
|---|---|---|---|---|---|---|
| A | 23 | 250 | 7 | +55 | 1.3 | 0.6 |
| B | 20 | 150 | 14 | +59 | 0.0 | 0.6 |
| C | 45 | 975 | 0 | +51 | | |
| D | 31 | 625 | 0 | +55 | 1.3 | 1.3 |
| E | 64 | 650 | 9 | +56 | | |
| Control | 56 | 650 | 17 | +77 | (¹) | (¹) |

¹ High.

As can be seen from the foregoing data, the finishes of this invention are extremely durable to laundering, even in the presence of a chlorine-type bleach. As further evidence of stability, the char lengths of two portions of Sample C which had been soaked for 4 and 8 hours, respectively, in an aqueous solution of 0.2 weight percent sodium carbonate and 0.5 weight percent sodium salt of N-methyl-N-oleoyltaurine (28 percent active) maintained at 95° C. were 7.0 and 8.7 inches. In addition, and unlike many nitrogenous fabric treatments, the samples treated in accordance with this invention were not chloride retentive. Finally, the physical properties of the treated cotton fabric were satisfactory.

EXAMPLE II

A total of 157 grams (0.80 mole) of dimethyl (ethoxycarboryl)methylphosphonate was added dropwise during a 10-minute period to a solution of 96.8 grams (0.96 mole) of biguanide in 2 liters of methanol. The resulting reaction mixture was kept at 60° to 65° C. for 0.5 hour, cooled to 20° C. and filtered. The solid was washed with methanol and dried in vacuo at room temperature to yield 151 grams of 2,4-diamino-6-(O,O'-dimethylphosphonomethyl)-s-triazine melting at approximately 220° C.

Analysis: Calculated for $C_6H_{12}N_5O_3P$: C, 30.9%; H, 5.15%; N, 30.1%; P, 13.3%. Found: C, 30.8%; H, 4.53%; N, 30.5%; P, 12.9%. The assigned structure was confirmed by infrared analysis and thin-layer chromatography.

A dispersion was made from 116 grams (0.5 mole) of 2,4-diamino-6-(O,O'-dimethylphosphonomethyl)-s-triazine and 300 grams of water. While the dispersion was kept at 60° C., a total of 170 grams of an aqueous 37 percent solution of formaldehyde (2.1 moles) and 2 milliliters of 2-normal sodium carbonate were added during a period of 0.5 hour. The pH went from 8.5 to 5 during the reaction period, and the final weight of the solution was 580 grams (theoretically 588 grams). Analysis of the solution indicated that 4.2 percent of it was free formaldehyde, and that 5.2 percent was bound formaldehyde, corresponding to two N-(hydroxymethyl) groups per molecule of the diamino s-triazine.

Analysis (of the solution): Calculated for $C_8H_{16}N_5O_5P$: N, 5.9%; P, 2.6%. Found: N, 6.0%; P, 2,4%.

A portion of the sheeting employed in Example 1 was padded to 107 percent wet pickup with a solution of 20 weight percent of the hydroxymethylated triazine produced as described; 3 weight percent "Catalyst XRF" (Aq. 30% soln.); and 77 weight percent water.

Subsequent processing was similar to that used in Example I, i.e., drying at 65° C., curing for 5 minutes at approximately 163° C., rinsing, and re-drying.

A second sample was prepared in a manner similar to that just described, except that the sheeting was padded to 102 percent wet pickup with a solution containing 1 weight percent hydrogen peroxide (as a 30 percent aqueous solution) in place of the "Catalyst XRF," and after padding the sample was dried to a moisture content of 20 percent, steamed for 8 minutes, and rinsed in an aqueous 0.1 percent solution of p-(1,1,3,3-tetramethylbutyl)phenoxynona-(ethylenoxy)-ethanol.

A third portion of the sheeting was padded to 114 percent wet pickup with a solution of 19.2 weight percent of the hydroxymethylamino triazine, 3.0 weight percent "Catalyst XRF" (aq. 30% soln.), 9.6 weight percent of $N^2,N^4,N^6$-tris(hydroxymethyl)melamine (TMM), and 68.2 weight percent water, and then processed in a manner similar to that described for Sample 1.

A fourth portion of the sheeting was padded to 106 percent wet pickup with 20 weight percent of the hydroxymethol-amino triazine, 1 weight percent of hydrogen peroxide (aq. 30% soln.), 10 weight percent of TMM, and 69 weight percent water, and then processed in a manner similar to that employed for Sample 2.

Part of the TMM pre-treated fabric prepared as described in the Sample D of Example I (4.5 percent of which was bound nitrogen from wet fixation of TMM) was padded to 99 percent wet pickup with the composition employed to prepare Sample 1 of this example and processed in a similar manner.

Data concerning all five samples with respect to treatment and evaluation are summarized in the accompanying table.

TABLE IV

| SAmple | Weight Gain, % | Fabric Content, % P | N | Char Length Inches |
|---|---|---|---|---|
| 1 | 18.2 | 1.26 | 2.74 | BEL |
| 2 | 14.1 | 1.32 | 3.02 | BEL |

| 3 | 32.1 | 1.58 | 7.05 | 4.4 |
| 4 | 24.2 | 1.28 | 6.65 | 4.3 |
| 5 | 18.3 | 1.55 | 9.49 | 4.5 |

EXAMPLE III

A total of 22 grams of diethyl 2-aminoethylphosphonate was added dropwise to a stirred suspension of 14.55 grams of 2,4-diamino-6-chloro-s-triazine in 200 milliliters of water at 90 to 95° C. The pH was kept at approximately 8.5 by the periodic addition of a total of 57 milliliters of 2-normal aqueous sodium carbonate. Those conditions were maintained for 1.5 hours, by which time the rate of consumption of sodium carbonate had diminished markedly. The pH was allowed to drop to 7.5, and a total of 3.6 grams of unreacted material was filtered off. Water was evaporated from the filtrate, and the organic portion of the remaining material was dissolved in 200 milliliters of hot 1-propanol and recrystallized by cooling to yield 9.0 grams of 2,4-diamino-6-[2-(O,O'-diethylphosphono)-ethylamino]-s-triazine, melting at 232° C. A 2-gram portion recrystallized from 20 milliliters of 1-propanol melted at 233° C.

Analysis: Calculated for $C_9H_{19}N_6O_3P$: C, 37.3%; H, 6.5%, N, 29.0%; P, 10.7%. Found: C, 37.1%; H, 6.6%; N, 29.6%; P, 11.6%.

The infrared spectrum was consistent with the assigned structure.

Employing procedures similar to those described in Example I, this product is then reacted with formaldehyde to produce a mixed hydroxymethylamino derivative, which in turn, is employed either alone or in combination with $N^2,N^4,N^6$-tris(hydroxymethyl)melamine, to render cotton flame retardant.

EXAMPLE IV

A mixture of 42.3 grams of 2,4-diamino-6-hydrazino-s-triazine, 108.2 grams of diethyl vinylphosphonate, and 200 milliliters of N,N-dimethylformamide was heated at 100° to 105° C. for 3 hours, and at 120° to 130° C. for 7 hours, after which time the vinyl content of the reaction mixture had decreased to 0.5 percent. The solvent and excess diethyl vinylphosphonate were removed under high vacuum to leave a yellow, viscous residue representing an almost quantitative yield of 2,4-diamino-6-(2,2-bis[2-(O,O'-diethylphosphono)ethyl]hydrazino)-s-triazine. By titration with hydrogen bromide in acetic acid using a pH meter to determine the end point, an equivalent weight of 481 was found (theory: 479).

A slurry was made from 108 grams of this product, 94 grams of aqueous 37 percent formaldehyde, and 50 grams of additional water. The mixture was heated at 50° to 60° C. for 5 hours while the pH was kept at 10 to 11 by a small addition of aqueous 50 percent sodium hydroxide. Upon analysis, the resulting aqueous solution had 12.29 percent total formaldehyde and 1.85 percent free formaldehyde (hence 10.44 percent bound formaldehyde in N-hydroxymethyl groups), representing a 96 percent conversion to the tetramethylol derivative, namely, 2,4-bis[bis(hydroxymethyl)amino]-6-{2,2-bis(O,O'-diethylphosphono)-ethyl]hydrazino}-s-triazine.

Employing procedures similar to those described in Example I, a sample of 100 percent cotton sheeting was padded to 108 percent wet pickup with a solution of 24 percent by weight of the thus-produced tetramethylol derivative; 3 percent by weight of "Catalyst XRF" (aq. 30 percent soln.); 10 percent by weight of tris(hydroxymethyl)melamine; and 63 percent by weight of additional water. The resulting sample was then dried at 70° C., cured for 5 minutes at approximately 163° C., rinsed, and re-dried. The sample had a weight gain of 22.5 percent and a char length of 5.8 inches.

A second portion of the sheeting was padded to 107 percent wet pickup with a solution of 30 percent by weight of the tetramethylol derivative; 1 percent by weight of hydrogen peroxide (aq. 30 percent soln.); 10 percent by weight of tris(hydroxymethyl)melamine; and 59 percent by weight of additional water. After processing of the sample by partial drying and steaming as described in Example II, the sample had a weight gain of 20.9 percent and a char length of 5.0 inches.

EXAMPLE V

A 5-liter flask was charged with 537 grams (2.8 moles) of the diethyl ester of 3-(O,O'-diethylphosphono)propionitrile, 277 grams (3.3 moles) of 1-cyanoguanidine, 3 liters of 1-propanol, and 90 grams of sodium ethoxide. The mixture was heated at reflux temperature for a total of approximately 30 hours, after which period it was filtered hot. Upon cooling 2,4-diamino-6-[2-(O,O'-diethylphosphono)ethyl]-s-triazine crystallized from the filtrate at room temperature. After a series of recrystallizations, a total of 415 grams (dry weight) of the 2,4-diamino-6-[2-(O,O'-diethylphosphono)ethyl]-s-triazine was obtained, melting at 171°–174° C. The infrared spectrum was consistent with the assigned structure. Analysis: Calculated for $C_9H_{18}N_5O_3P$: C, 39.0%; H, 6.6%; N, 25.5%; P, 11.3%. Found: C, 38.6%; H, 6.0% N, 25.9%; P, 12.0%.

Aqueous 37 percent formaldehyde (830 grams, 10.2 moles) was adjusted to pH 9 by the addition of aqueous 50 percent sodium hydroxide, and the combination was added to 638 grams (2.32 moles) of the 2,4-diamino-6-[2-(O,O'-diethylphosphono)ethyl]-s-triazine. Solution was hastened by warming the mixture to 55° C. for approximately 6 hours, during which time the pH stayed between 8 and 9. Upon analysis, the resulting aqueous solution had 21.03% total formaldehyde and 5.54 percent free formaldehyde (hence 15.49 percent bound formaldehyde in N-hydroxymethyl groups). The reaction solution was a 64 percent solution, 79 percent converted to 2,4-bis[bis-(hydroxymethyl)amino]-6-[2-(O,O'-diethylphosphono)ethyl]-s-triazine.

Employing procedures similar to those disclosed in Example I, two samples of cotton sheeting were padded to 92 to 94 percent wet pickup with an aqueous solution containing 25 weight percent of the triazine and 3 weight percent "Catalyst XRF," dried at 70° C. and cured at 163° C. for 5 minutes. After rinsing and drying one sample (Sample A) was padded to 88 percent wet pickup with an aqueous solution containing 10 weight percent TMM and 0.3 weight percent hydrogen peroxide. The second sample (B) was padded in a similar bath, except that the bath contained 15 percent TMM.

A third sample (C) was treated in a manner similar to that for Sample B, except that the first bath contained only 15 percent of triazine compound and the second padding was to 97 percent wet pickup.

Two additional samples (D and E) were padded to 105 percent wet pickup with a bath containing 30 percent triazine, 10 percent TMM and 0.3 percent peroxide (D) or 15 percent triazine 15 percent TMM and 0.3 percent peroxide.

All five samples were partially dried to a moisture content of about 20 percent, and then steamed for 8 minutes, rinsed and dried.

Analyses of the resulting samples are summarized in Table V.

TABLE V

| Sample | Weight Gain,% | Content Original | | After Handling | |
|---|---|---|---|---|---|
| | | P | N | P | N |
| A | 3.8 | 1.3 | 6.0 | 1.3 | 5.4 |
| B | 7.1 | 1.3 | 8.4 | 1.4 | 6.7 |
| C | 10.6 | 0.7 | 7.3 | 0.7 | 6.4 |
| D | 29.3 | 1.7 | 6.9 | 1.5 | 6.0 |
| E | 22.8 | 0.8 | 7.1 | 0.8 | 6.4 |

* After 25 launderings with persulfate bleach at a level of 0.25 pint per 16 gallons.

The char lengths of the samples are summarized in Table VI.

TABLE VI

| Sample | Char Length, inches | | | |
|---|---|---|---|---|
| | No Laundry | 10 Launderings No Bleach | 25 Launderings Bleach No Bleach | Bleach |
| A | 3.8 | 4.5 | 3.9 5.0 | 5.0 |
| B | 3.6 | 4.4 | 4.1 5.7 | 4.1 |
| C | 4.2 | 6.5 | 6.5 4.7 | 4.5 |
| D | 4.5 | 7.6 | 6.1 BEL | BEL |
| E | 4.6 | 9.1 | 8.0 7.0 | 6.9 |

EXAMPLE VI

To 120 grams (0.84 mole) of 2,4-diamino-6-mercapto-s-triazine and one liter of warm water in a 5-liter flask was added, with stirring, a solution of 35.2 grams (0.88 mole) of sodium hydroxide in 200 ml. of water, followed by 2.5 liters of ethanol. The pH was adjusted to approximately 9.5 by the addition of dilute hydrochloric acid, and then a total of 206 grams (0.84 mole) of diethyl 2-bromoethylphosphonate was added. The reaction mixture was stirred and heated at reflux temperature for approximately 14 hours, during which time the pH was kept at approximately 9.5 by addition of aqueous 50 percent sodium hydroxide. The reaction mixture was filtered and the precipitate was washed with ethanol. Solvent was evaporated from the main filtrate, and the residual material was heated for a period of approximately 7 hours in 3 liters of refluxing ethyl acetate to induce further reaction. The reaction mixture was filtered, and the filtrate was cooled to induce crystallization. A total of 145 grams (dry weight) of 2,4-diamino-6-[2-(O,O'-diethylphosphono)ethylthio]-s-triazine was collected, a yield of 56.5 percent, melting at 145° to 147° C. The infrared spectrum was consistent with the assigned structure.

In another run, the charge in a 2-liter flask consisted of 43.5 grams (0.264 mole) of 2,4-diamino-6-mercapto-s-triazine, 63.8 grams (0.26 mole) of diethyl 2-bromoethylphosphonate, 600 ml. of denatured alcohol 3A (5 volumes of methanol for every 100 volumes of 95 percent ethanol), and 100 ml. of water. The slurry was heated at reflux temperature for a total of approximately 20 hours. After removal of 10 grams of byproduct by filtration, the filtrate was evaporated, and the residue was extracted by 3 liters of ethyl acetate. The hot filtrate was concentrated by evaporation. A total of 59 grams (dry weight) of 2,4-diamino-6-[2-(O,O'-diethylphosphono)-ethylthio]-s-triazine was collected, a yield of 74 percent, melting at 144° to 147° C. After recrystallization from ethyl acetate, it melted at 146.5 to 148° C.

Analysis: Calculated for $C_9H_{18}N_5O_3PS$: C,35.2%; H,5.86%; N,22.8%; S,10.1%. Found: C,36.8%; H,5.60%; N,22.8%; S,10.2%.

Aqueous 36 percent formaldehyde (33 grams, 0.4 mole) was adjusted to pH of 10 by the addition of potassium carbonate in a 250-ml. roundbottom 3-neck flask. A total of 23 grams (0.075 mole) of 2,4-diamino-6-[2-(O,O'-diethylphosphono)ethylthio]-s-triazine was added. The mixture was heated to 60° C., which resulted in solution. Heating at 60° C. was continued for a total of 12 hours. After filtering, the filtrate had 20.4 percent total formaldehyde and 6.6 percent free formaldehyde (hence 13.8 percent bound formaldehyde in N-hydroxy-methyl groups). The reaction solution, 45 grams, represented an 82 percent conversion to 2,4 - bis[bis(hydroxymethyl)amino]-6-[2-(O, O'-diethylphosphono)ethylthio]-s-triazine.

In another trial, the charge in a 1-liter flask consisted of 145 grams (0.473 mole) of 2,4-diamino-6-[2-(O,O'-diethylphosphono)ethylthio]-s-trazine 197 grams (2.36 moles) of aqueous 36 percent formaldehyde, and enough aqueous 50 percent sodium hydroxide to maintain the pH at 10. Heating at 60° C. resulted in solution, and that temperature was maintained for approximately 6 hours. The resulting 340-gram solution had 18.99 percent total formaldehyde and 4.4 percent free formaldehyde (hence 14.6 percent bound formaldehyde in N-hydroxymethyl groups). The reaction solution, 60 percent active, represented approximately 87 percent conversion to 2,4-bis[bis(hydroxymethyl)amino]-6-[2-(O,O'-diethylphosphono)ethylthio]

Employing procedures similar to those described in Example I, cotton is treated with the thus-produced product, either alone or in combination with $N^2,N^4,N^6$-tris(hydroxymethyl)-melamine, to render cotton flame-retardant.

EXAMPLE VII

Diethyl vinylphosphonate, 61.5 percent active by vinyl analysis, was made by following directions of G. Kosolapoff, J. Am. Chem. Soc., Vol. 70, page 1971 (1948). A total of 1,000 grams of that material (containing 3.75 moles of diethyl vinylphosphonate) was dropped into 3 liters of a saturated solution of ammonia in ethanol at room temperature over a period of approximately 2 hours. Ammonia was slowly passed into the solution during the next 5 days, by which time the starting compound had disappeared almost completely (followed by thin-layer chromatography). Ammonia and alcohol were removed by volatilization at room temperature. The crude residue, 830 grams, contained 2.5 moles of amine by titration with hydrochloric acid, and vinyl was absent. Approximately equal molar quantities were present of diethyl 2-aminoethylphosphonate (the 1:1 adduct of ammonia and vinylphosphonate) and tetraethyl 2,2'-iminobis(ethylphosphonate) (the 1:2 adduct of ammonia and diethyl vinylphosphonate).

A total of 565 grams (1.7 moles of total amine) of the crude residue was added dropwise over 30 minutes at a pH of 7.8 to a stirred suspension of 228 grams (1.55 moles) of 2,4-diamino-6-chloro-s-triazine in 2 liters of water at 85° C. Then the pH was raised to 8.5 by the addition of 20 grams of sodium carbonate. During the next 3 hours the pH was kept at 8.5 by the addition of 110 grams of sodium carbonate, and the temperature was kept between 90° and 95° C. At the end of that period, the reaction mixture was filtered. The filter cake was washed and dried to yield 93.7 grams of a solid which was mainly unreacted 2,4-diamino-6-chloro-s-triazine.

The filtrate was neutralized to pH 7 by means of 115 ml. of 15 percent hydrochloric acid. Then it was evaporated under diminished pressure to approximately 750 ml., and the precipitate was filtered off. The filter cake (245 grams) was dissolved in 1 liter of boiling 1-propanol, leaving an insoluble residue weighing 7.5 grams. The propanol solution was concentrated to about 400 ml. and a total of 83.5 grams of $N^2$-[2-(O,O'-diethylphosphono)ethyl]melamine melting at 219° to 220° C. was obtained on crystallization.

Analysis: Calculated for $C_9H_{19}N_6O_3P$ : C, 37.3%; H, 6.55%; N, 28.9%; P, 10.6%.

Found: C, 36.4%; H, 6.04%; N, 28.3%; P, 10.6%. The infrared spectrum was consistent with the assigned structure.

Solvent was evaporated from the filtrate remaining after the crystallization, leaving a residue of 150 grams. The residue was crystallized from 150 ml. of water, from which a total of 99 grams $N^2,N^2$-bis[2-(O,O'-diethylphosphono)ethyl]melamine was obtained melting at 137° to 138° C.

Analysis: Calculated for $C_{15}H_{32}N_6O_6P_2$: C, 39.7%; H, 7.05%; N, 18.5%; P, 13.7%.

Found: C, 39.9%; H, 6.62%; N, 18.3%; P, 12.9%.

The infrared spectrum was consistent with the assigned structure.

The $N^2$-[2-(O,O'-diethylphosphono)ethyl]melamine (120 grams, 0.414 mole) and aqueous 37% formaldehyde (167.5 grams, 2.07 moles) were mixed together and heated to 60° C. The pH was adjusted to 8 by the addition of 0.3 ml. of 1-normal sodium carbonate. Both temperature and pH were kept constant for a 5.5-hour period. Then the reaction mixture was kept at room temperature for 2 days. Upon analysis, the resulting aqueous solution had 4.55 percent free formaldehyde. Hence, each molecule of the melamine compound had reacted with an average of 3.97 molecules of formaldehyde, and the principal reaction product was a tetrakis(hydroxymethyl) derivative of N²-[2-(O,O'-diethylphosphono)ethyl]melamine.

Employing procedures similar to those described in Example I, this product is employed, either alone or in combination with N²,N⁴,N⁶-tris(hydroxymethyl)melamine, to render cotton flame-retardant.

The N²,N²-bis[2-(O,O'-diethylphosphono)ethyl]melamine (100 grams, 0.22 mole), aqueous 37 percent formaldehyde (89.2 grams, 1.1 moles), and 100 grams of distilled water were mixed together and heated at 60° C. for 2 hours after the pH had been adjusted to 8 by the addition of 0.4 ml. of 1-normal sodium carbonate. Heating at 60° C. was continued for an additional 8.5 hours with the pH as high as 9.5. Then the reaction mixture was kept at room temperature for a day. Upon analysis, the thus-obtained aqueous solution had 9.95 percent total formaldehyde and 3.04 percent free formaldehyde (hence 6.91 percent bound formaldehyde in the form of N-(hydroxymethyl) groups). The mixture was filtered. Analysis of the filtrate showed that each molecule of the melamine compound had reacted with an average of 2.9 molecules of formaldehyde. Hence the reaction product consisted principally of the tris(hydroxymethyl) derivative of N²,N²-bis[2-(O,O'-diethylphosphono)ethyl]melamine.

Employing procedures similar to those described in Example I, this product is employed, either alone or in combination with N²,N⁴,N⁶-tris(hydroxymethyl)melamine, to render cotton flame-retardant.

We claim:

1. A method for rendering a cellulosic substrate flame retardant which comprises treating said substrate with a compound of the formula:

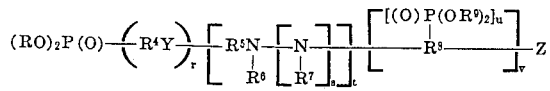

wherein R is lower alkyl, halogen-substituted lower alkyl or O,O'-di-lower alkylphosphono-substituted lower alkyl; each of R⁴ and R⁵ is alkylene of not more than 10 carbons; R⁶ is hydrogen, lower alkyl, or O,O'-substituted-phosphonoalkyl of the formula $(R^9O)_2P(O)R^4$; R⁷ is hydrogen or lower alkyl; R³ is alkylene or alkanetriyl of not more than 10 carbons; R⁹ is lower alkyl; Y is oxy, thio, imino or lower alkylimino; each or r, s, t, u, and v has a value of 0 or 1; with the provisos that the total carbons in R⁴,R⁵ and R⁸ is not more than 10; the sum of each of r+s, r+u and t+u is 1; r is 0 when R⁶ is phosphonoalkyl; and u is 0 and R⁶ is hydrogen or alkyl when R is phosphonoalkyl; and Z is represented by the formula:

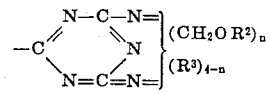

wherein each of R² and R³ is hydrogen or lower alkyl and n is an integer having a value of from 1 to 4.

2. A method according to claim 1 wherein said substrate is cotton and said compound is added in an amount sufficient to provide a phosphorus content, based upon the weight of the cotton, of from about 0.2 to about 3 weight percent.

3. A method according to claim 1 wherein said compound is employed in admixture with an organo-nitrogen compound.

4. A method according to claim 3 wherein said compound is employed in admixture with an organo-nitrogen compound in an amount sufficient to provide a nitrogen content of at least the value of the expression 6-2P wherein P is the weight percent phosphorus.

5. The product of the process of claim 2.

6. The product of the process of claim 4.

* * * * *

UNITED STATES PATENT OFFICE
CERTIFICATE OF CORRECTION

Patent No. 3,650,670  Dated March 21, 1972

Inventor(s) Tesoro et al

It is certified that error appears in the above-identified patent and that said Letters Patent are hereby corrected as shown below:

Column 1, line 66: "bis (hydroxymethyl)amino]6-yl" should read --bis (hydroxymethyl)amino]-s-triazin-6-yl--

Column 2, line 10: The right side of formula (II) should read:

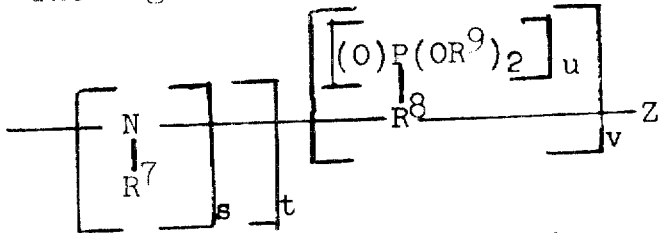

line 57: The right side of Formula (III-B) should read line 68: " $\{$ (Di-" should read -- $\{$ [ (Di- --

Column 9, line 5: The formula should read (-CON$<$)

line 8: The formula should read (-SO$_2$N$<$)

Column 10, line 75: "herein" should read --wherein--

Column 11, line 69: "110-1964-9" should read --110-1964-T--

Column 17, line 58: "diethylphosphone)'" should read --diethylphosphono)--

UNITED STATES PATENT OFFICE
CERTIFICATE OF CORRECTION

Patent No. 3,650,670  Dated March 21, 1972

Inventor(s) Tesoro et al    - 2 -

It is certified that error appears in the above-identified patent and that said Letters Patent are hereby corrected as shown below:

(CONTINUED)

Column 18, line 4:  "diethylphosphono)ethylthio]" should read --diethylphosphono)ethylthio]-s-triazine--

Column 20, line 5:  "$R^3$" should read --$R^8$-- line 15:  In the formula "=C=N=" should read -- =C-N= --

Signed and sealed this 9th day of January 1973.

(SEAL)
Attest:

EDWARD M. FLETCHER, JR.    ROBERT GOTTSCHALK
Attesting Officer    Commissioner of Patents